(12) United States Patent
Hadar et al.

(10) Patent No.: US 11,813,780 B2
(45) Date of Patent: Nov. 14, 2023

(54) POLYMER MOLD INSERT FOR AN INJECTION MOLDING TOOL

(71) Applicant: LEGO A/S, Billund (DK)

(72) Inventors: Ronen Hadar, Billund (DK); Vimal Patel, Billund (DK); Raphael Schlichting, Billund (DK); Mandaná Moshiri, Billund (DK)

(73) Assignee: LEGO A/S, Billund (DK)

( * ) Notice: Subject to any disclaimer, the term of this patent is extended or adjusted under 35 U.S.C. 154(b) by 70 days.

(21) Appl. No.: 16/975,345

(22) PCT Filed: Feb. 27, 2019

(86) PCT No.: PCT/EP2019/054868
§ 371 (c)(1),
(2) Date: Aug. 24, 2020

(87) PCT Pub. No.: WO2019/166492
PCT Pub. Date: Sep. 6, 2019

(65) Prior Publication Data
US 2021/0379803 A1 Dec. 9, 2021

(30) Foreign Application Priority Data
Feb. 27, 2018 (DK) .......................... PA 2018-70129

(51) Int. Cl.
*B29C 45/14* (2006.01)
*B29C 45/26* (2006.01)

(52) U.S. Cl.
CPC .............. *B29C 45/14* (2013.01); *B29C 45/26* (2013.01)

(58) Field of Classification Search
CPC ......... B29C 45/14; B29C 45/26; B29C 64/40; B29C 64/393; B33Y 10/00; B33Y 40/00; B33Y 50/02
See application file for complete search history.

(56) References Cited

U.S. PATENT DOCUMENTS

| 5,439,622 A | 8/1995 | Pennisi et al. |
| 5,458,818 A | 10/1995 | Bang et al. |
| (Continued) | | |

FOREIGN PATENT DOCUMENTS

| CN | 101456225 A | 6/2009 |
| CN | 105209241 A | 12/2015 |
| (Continued) | | |

OTHER PUBLICATIONS

First Office Action issued in corresponding Chinese patent application No. 201980021743.8, dated Nov. 22, 2021, 13 pages (English translation only).

(Continued)

*Primary Examiner* — Joseph S Del Sole
*Assistant Examiner* — John Robitaille
(74) *Attorney, Agent, or Firm* — Day Pitney LLP; Anthony A. Kassas

(57) ABSTRACT

A polymer mold insert (2) for an injection molding tool (5), the polymer insert (2) comprising an insert body part having an outer shape adapted for insertion into an insert cavity (7) arranged in the injection molding tool (5), and where the insert body part comprises at least two different polymer materials having different physical characteristics and being distributed within the insert body so that one or more first volumes (8) of the insert body comprises a higher concentration of a first one of the two different polymer materials than in the remaining parts insert body, and so that one or more second volumes (9) of the insert body comprises a higher concentration of the second one of the two different polymer materials than in the remaining parts of the insert body part.

14 Claims, 4 Drawing Sheets

(56) References Cited

U.S. PATENT DOCUMENTS

2011/0130854 A1    6/2011  Ettenbauer et al.
2015/0336298 A1   11/2015  Dean

FOREIGN PATENT DOCUMENTS

| CN | 106945204 A | 7/2017 | |
| DE | 69417972 T2 | 10/1999 | |
| DE | 10347786 A1 | 5/2005 | |
| DE | 102009052213 A1 | 5/2011 | |
| EP | 1 34 065 A2 | 9/2001 | |
| WO | WO-2019012103 A1 * | 1/2019 | ............ B22F 3/225 |

OTHER PUBLICATIONS

Search Report and Opinion issued in priority application No. DK PA 2018 70129, dated Aug. 6, 2018. (8 pages).
International Search Report and Written Opinion of the International Searching Authority issued in corresponding International application No. PCT/EP2019/054868, dated Jun. 7, 2019. (12 pages).

* cited by examiner

POLYMER MOLD INSERT FOR AN INJECTION MOLDING TOOL

CROSS-REFERENCE TO RELATED APPLICATIONS

This application is a U.S. National Stage of International Application No. PCT/EP2019/04868, filed on 27 Feb. 2019 and published on 6 Sep. 2019, as WO 2019/166492 A1, which claims the benefit of priority to Danish Patent Application No. PA 2018 70129, filed on 27 Feb. 2018. The content of each of the above referenced patent applications is incorporated herein by reference in its entirety for any purpose whatsoever.

TECHNICAL FIELD

The present disclosure relates to a polymer mold insert for an injection molding tool.

BACKGROUND

Injection molding is a widely used manufacturing process for producing parts by injecting material into a mold. Injection molding can be performed with a host of materials including elastomers, thermoplastic and thermosetting polymers. Typical injection molding processes involve heating and melting the material, injecting the melted material into a mold cavity, allowing the injected material to cool and harden to the configuration of the cavity and ejecting the hardened part.

Traditionally, once the part to be molded has been designed, usually by an industrial designer or an engineer, a tool maker has designed and precision machined a suitable mold from metal, such as steel or aluminium, so as to form the features of the designed part. The initial design and manufacture of the mold using traditional mold insert manufacturing techniques is quite costly. Once a mold is manufactured it can be used, in some instances, to manufacture millions of parts.

The properties of the injection molded part depend on a variety of factors, such as the choice of material, the process parameters, and the design of the mold.

Examples of design features of an injection mold that influence the quality of the resulting part include that arrangement of gates though which the molten material is injected into the cavity, the arrangement of cooling channels through which coolant is passed so as to cool the injected material, the location of the parting lines, etc.

As a result, typical injection molding tools are costly to produce with high quality which, however is of critical importance for the quality of the injection molded parts.

Several attempts have been made to make the manufacturing of the molds more cost efficient and time efficient.

To ease maintenance and venting, an injection mold may be provided with an insert. Inserts are parts of the mold that are created separately from the mold cavity block. The inserts are inserted in the block to achieve a desired cavity shape or cooling effect. This may be useful when only relatively small numbers of parts are to be produced or when specific cooling properties are desired. Mold inserts have the function of forming the injected material into the desired shape. They contain important features such the shape-giving geometry, element cavities and cooling channel systems.

Advances in additive manufacturing technologies, such as 3D printing, have allowed using photopolymers which do not melt during the injection molding of some lower temperature thermoplastics, to be used for some simple injection molds or inserts.

However, despite these efforts, it remains desirable to provide more options for designing and manufacturing mold inserts and/or other components of a mold for injection molding that are suitable for the molding of high-quality parts having small tolerances.

SUMMARY

Disclosed herein are embodiments of a polymer insert for an injection molding tool, the insert comprising an insert body part having an outer shape adapted for insertion into an insert cavity arranged in an injection molding tool, and where the insert body part comprises at least two different polymer materials having different physical characteristics and being distributed within the insert body so that one or more first volumes of the insert body comprises a higher concentration of a first one of the two different polymer materials than in the remaining parts insert body, and one or more second volumes of the insert body comprises a higher concentration of the second one of the two different polymer materials than in the remaining parts of the insert body part.

Furthermore embodiments of an injection molding tool are disclosed comprising a polymer insert as mentioned above.

The two different polymers may comprise the first polymer material having a high heat conductivity and the second polymer material having a lower heat conductivity than the first polymer material.

Furthermore the two different polymer materials may comprise the first one of the polymer materials having high wear resistance properties and a the second one of the polymer material having a lower wear resistance properties than the first one of the polymer materials.

The polymer insert may comprise one or more cooling channels extending through the insert body part, and where at least one of the first volumes of the insert body part completely or at least partly surrounds the cooling channel and comprises the first one of the polymer materials having a higher heat conductivity than the polymer material in the second volumes of the insert body part.

The polymer insert may comprise at least one inner surface of the polymer insert that are exposed to a flow of molten material during the molding process in the injection mold, and where at least one of the first volumes of the insert body part completely or at least partly forms the inner surface and comprises the first one of the polymer materials having a higher wear resistance than the polymer material in the second volumes of the insert body part.

The at least one inner surface of the polymer insert may at least partly constitute a runner channel, a sprue gate or a tunnel gate in the injection molding tool Alternatively the at least one inner surface of the polymer insert may at least partly constitute a mold cavity in the injection molding tool The distribution of the two different polymer materials in the polymer insert may comprise multiple small volumes (voxels), and where a number of the small volumes are constituted only by the first one of the polymer materials and the remaining numbers of small volumes are constituted by the second one of the polymer materials.

BRIEF DESCRIPTION OF THE DRAWINGS

The above as well as additional objects, features and advantages of the aspects disclosed herein will be better understood through the following illustrative and non-limiting detailed description of preferred embodiments, with reference to the appended drawings, where like reference numerals will be used for like elements.

The accompanying drawings are included to provide a further understanding of the aspects disclosed herein, and they are incorporated in, and constitute a part of, this specification. The drawings illustrate embodiments of the aspects disclosed herein and, together with the description, serve to explain the principals of the aspects disclosed herein. Other and further aspects and features will be evident from reading the following detailed description of the embodiments. These drawings depict only typical embodiments and are not therefore to be considered limiting of its scope.

DETAILED DESCRIPTION

Figure 1:
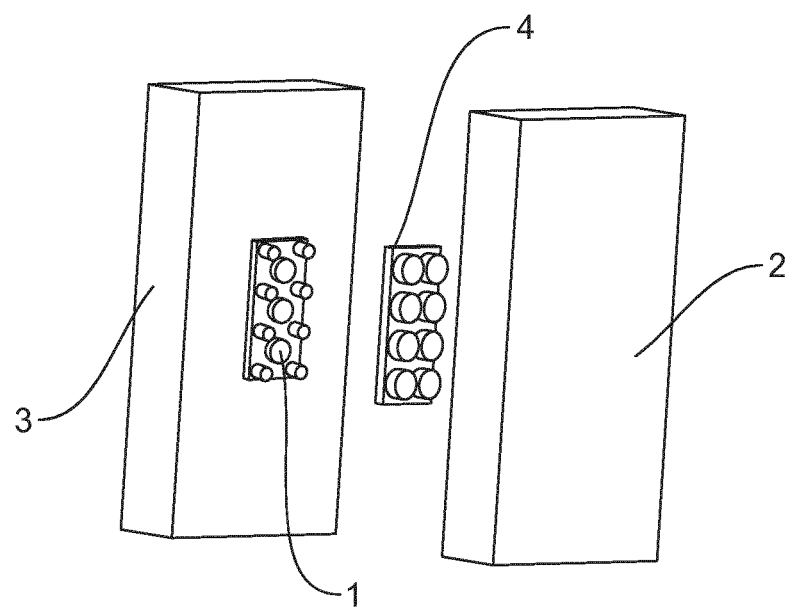
FIG. 1 schematically illustrates an embodiment of a mold polymer insert.

FIG. 1 schematically illustrates an embodiment of a polymer mold insert. This mold insert of FIG. 1 includes two parts 2 and 3, respectively that together define a mold cavity 1 for molding a part 4, in this example a plastic toy construction element.

The two parts 2, 3 of the polymer mold insert each has an outer surface that fits into an insert cavity of an injection molding tool (not shown). Mold inserts of this type is well known in the prior art especially made from steel or another metal, and the construction and design of the mold insert as well as the injection molding tool and the means for holding the mold insert in place in the injection molding tool are known in various different embodiments in existing tool constructions.

Figure 2:
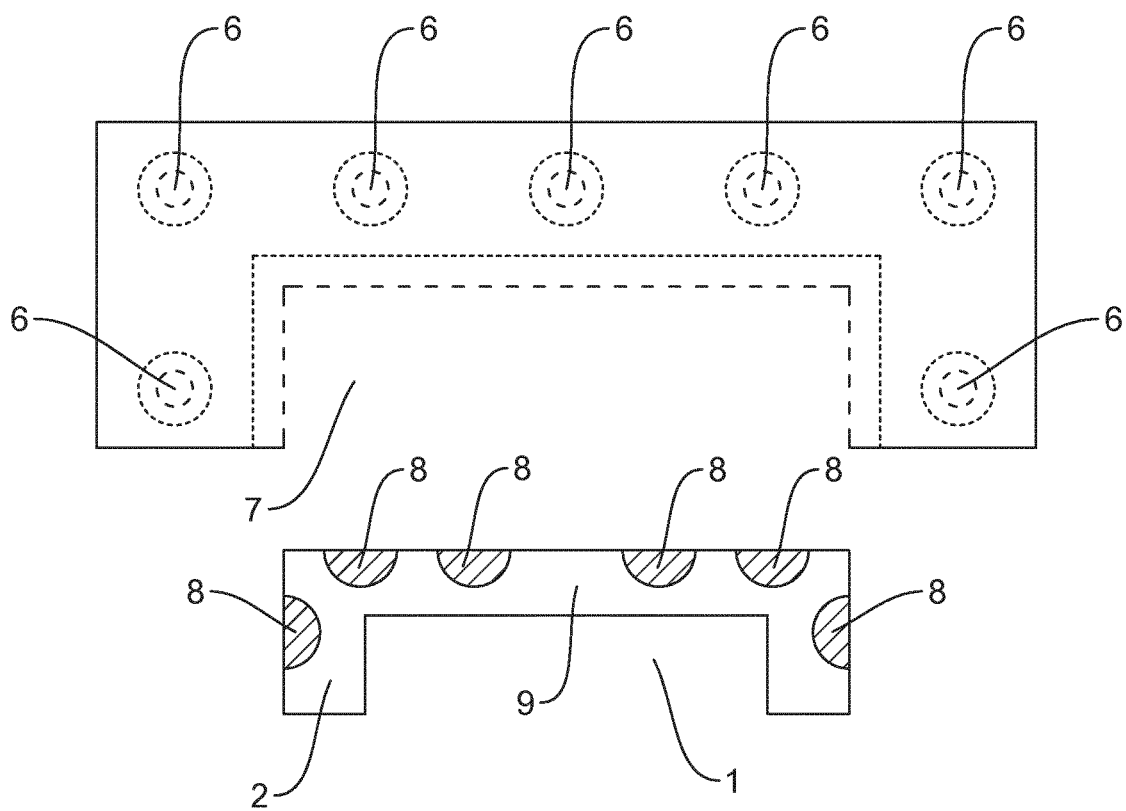
FIG. 2 schematically illustrates an embodiment of an injection molding tool and a mold polymer insert according to the invention.

FIG. 2 shows a cross section through an injection molding tool 5 equipped with one part of the polymer mold insert 2 shown in FIG. 1. The injection molding tool 5 is equipped with a set of cooling channels 6, and an insert cavity 7 adapted for receiving and holding the polymer mold insert part 2. According to the invention the polymer mold insert is formed by a number of first volumes 8, and a second volume 9.

Due to the fact that the cooling channels 6 are arranged very close to the inside surface of the insert cavity 7, then the temperature of this inside surface of the insert cavity may be lower near the cooling channels and higher between the cooling channels.

According to this embodiment of the invention the first volumes 8 therefore consists of a polymer material having a higher heat conductivity than the polymer material forming the second volume 9. Thereby the uneven temperature at the inside surface of the insert cavity 7 will not result in a correspondingly variation of the temperature of the inside surface of the mold cavity.

On the other hand the polymer material forming the second volume 9 of the polymer mold insert may consist of a polymer material having a higher resistance to wear during the molding cycles than what is the case with the polymer material forming the first volumes 8, and thereby the polymer mold insert can be designed both for optimal wear resistance and thermal distribution.

Figure 3:
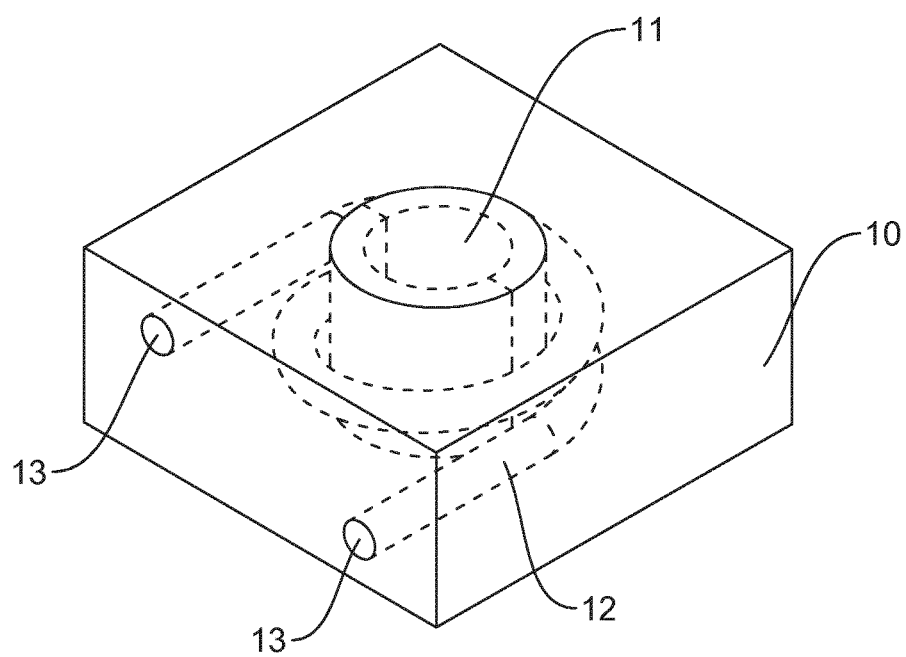
FIG. 3 schematically illustrates an alternative embodiment of a mold polymer insert according to the invention in the form of a mold cavity insert with an integrated cooling channel.
Figure 4:
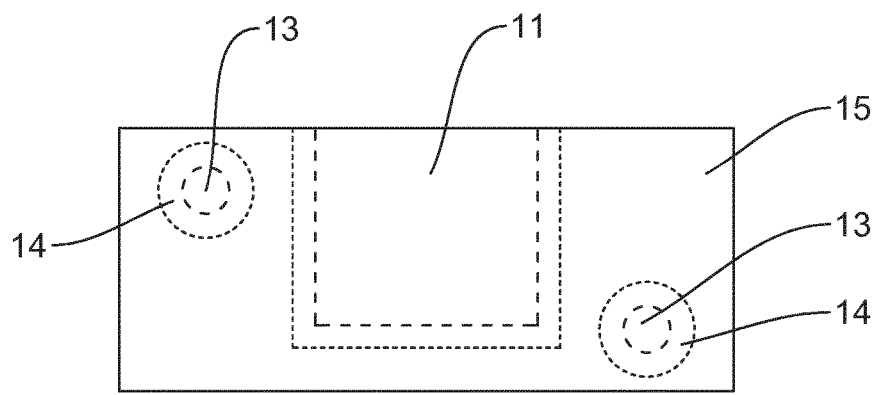
FIG. 4 schematically illustrates a cross section through the mold polymer insert shown in FIG. 3

FIGS. 3 and 4 shows an alternative embodiment of an insert according to the invention, where the polymer mold insert 10 is equipped with mold cavity 11 and a cooling channel 12 surrounding the mold cavity 11 and having openings 13 for supply of cooling liquid. In this embodiment the polymer mold insert 10 has a first volume 14 surrounding the cooling channel 13, and the first volume 14 is made from a first polymer material having higher heat conducting properties than the polymer material forming the second volume 15 of the polymer mold insert, so that a more even cooling effect is provided to the mold cavity.

The present invention is not only applicable as an alternative to conventional mold cavity inserts. It may also be used for lining the runner systems of injection molding tools, and for replacing the sprue gate and/or the tunnel gates at the runner system.

Figure 5:
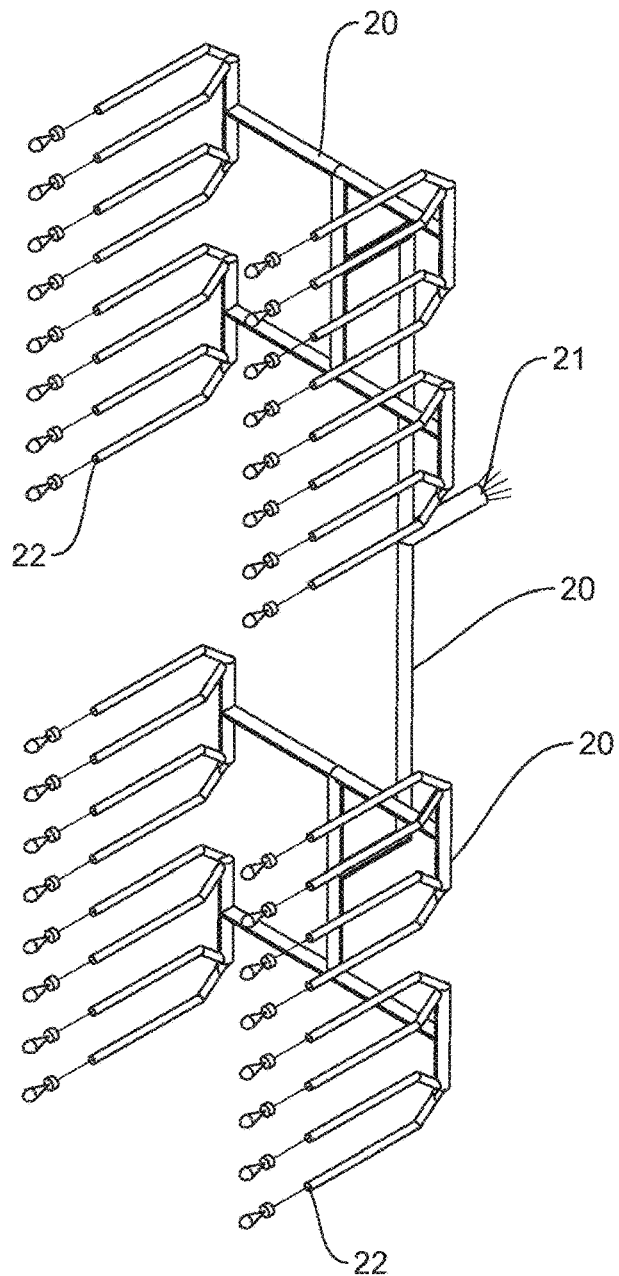
FIG. 5 schematically illustrates an alternative embodiment of a mold polymer insert according to the invention in the form of a set of inserts together forming a liner for the runner system as well as a sprue gate and tunnel gate for an injection molding tool.

FIG. 5 therefore shows an embodiment of a polymer mold insert comprising multiple tubular runner sections 20 that are assembled to form a complete runner liner system extending between a sprue gate 21 and the multiple tunnel gates 22 connecting the runner system to each of the mold cavities (not shown).

Figure 6:
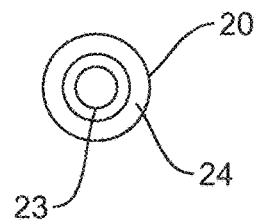
FIG. 6 shows a cross section through one of the liners shown in FIG. 5.

FIG. 6 shows a cross section through one of the tubular runner sections 20, where a first volume 23, is made from a material having a higher resistance to wear than the material forming the second volume 24, and the second volume 24 is made from a polymer material having a higher hear conductivity than the polymer material forming the first volume 23.

Figure 7:
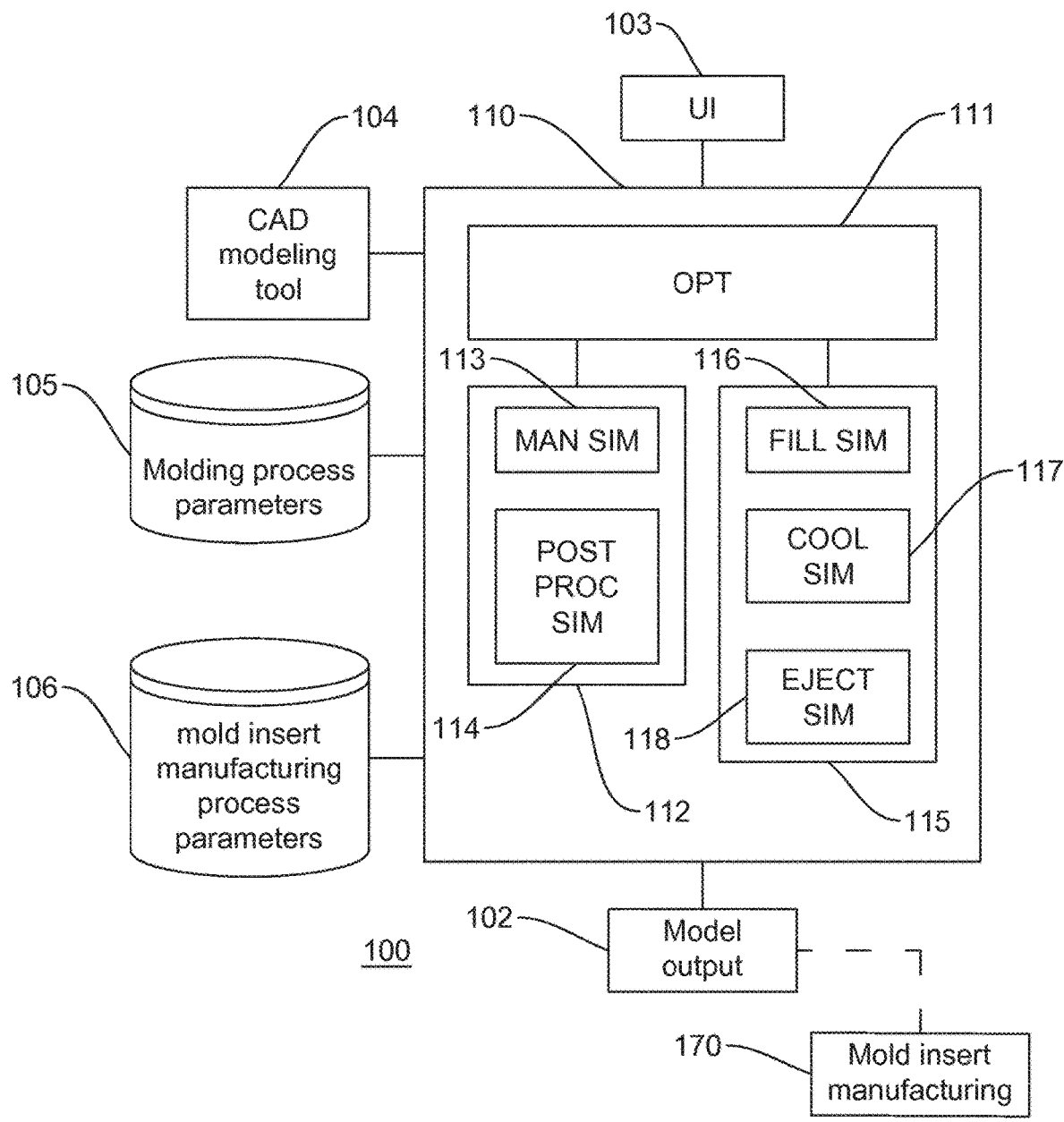
FIG. 7 schematically illustrates an embodiment of a data processing system for designing a mold insert.

FIG. 7 schematically illustrates an embodiment of a data processing system, generally designated by reference numeral 100, for designing a mold insert.

The data processing system 100 may be implemented by a suitably programmed computer or other computing infrastructure implementing a mold insert optimization module 110, a CAD modelling module 104, a database 105 for storing molding process parameters, a database 106 for storing mold insert manufacturing process parameters, a user interface module 103 and a model output module 102. The various modules may be implemented as respective software applications executed by the data processing system. It will be appreciated that some or all of the modules may be combined into a single software application.

The CAD modeling module 104 is configured to allow users to create, edit, display, visualize, and store CAD models of parts to be injection molded and of injection mold inserts. The CAD modelling module 104 may e.g. be implemented as a conventional, commercially-available CAD modeling tool known per se in the art. Models developed or modified using the CAD modeling module 104 can be used as inputs to the mold insert optimization module 110. In particular, the CAD modelling module allows a user to create a CAD model of the part to be injection molded and for which an optimized mold insert is to be created. Additionally, the CAD modelling module may be used by a user to create an initial CAD model of a mold insert that may be used by the mold insert optimization module as a starting point for the optimization of the mold insert design. Alternatively, the mold insert optimization module may automatically create an initial CAD model of the mold insert.

The database 105 has stored therein information about the molding process, including material properties and process conditions. The material properties include parameters such as viscosity, heat conductivity, etc. of various materials used for injection molding the parts, such as for various elastomers, thermoplastic and thermosetting polymers. Database 105 further includes various process parameters descriptive of the injection molding process, or ranges for such parameters, e.g. pressure, temperature, cooling schedule, etc.

The database 106 has stored therein information about the mold insert manufacturing process, including material properties and process conditions. The material properties include physical parameters such as specific density, heat conductivity, elasticity, etc. and other material-specific parameters, such as cost, typical lifetime, available material-specific manufacturing processes, etc. of various materials used for manufacturing the mold insert. Database 105 further includes various process parameters descriptive of the manufacturing process for manufacturing the mold insert. Examples of process parameters in additive manufacturing processes may include: laser power, laser scan speed, hatching distance, layer thickness, laser beam focus diameter, etc. Other examples of process parameters may refer to the material used for the process itself, e.g. powder (composition, powder size distribution, morphology, flowability, apparent density, etc.

It will be appreciated that databases 105 and 106 may be implemented as separate databases or as a combined database.

The user interface module 103 is configured to provide functionality allowing a user of the system to interact with the mold insert optimization module, e.g. for entering input parameters, viewing results, selecting results, etc.

The model output module 102 is configured to provide a CAD model of the optimized mold insert for use by an external mold manufacturing system 170. The model output module 102 may comprise a suitable data storage for storing the CAD model and/or a data communications interface for communicating a CAD model to another system, e.g. via a computer network.

The mold insert optimization module 110 includes and optimizer engine 111, a mold insert manufacturing simulator 112 and an injection molding simulator 115.

The optimizer engine 111 defines the initial values of the input parameters for the simulation, initiates the simulators 112 and 115, respectively, evaluates the results of the simulations, adjusts the simulations parameters based on the evaluation, and iterates the simulation with adjusted parameters until the result of the simulations fulfill predetermined criteria. In particular, the optimizer engine 111 defines an initial model of the mold insert, e.g. as received from the CAD modeling module 104, and initial values of the process parameters, e.g. based on user input and/or from data stored in databases 105 and 106.

The optimizer engine 111 initially executes the simulator 112 to perform a simulation of the mold insert manufacturing process based on the received CAD model of the mold insert and the associated mold insert manufacturing process parameters. The simulation of the mold insert manufacturing process results in a model of the manufactured mold insert. It will be appreciated that the simulation process may be an iterative process where various process parameters and/or the mold insert model may iteratively be modified so as to optimize for one or more parameters, such as production cost, etc.

Subsequently, the optimizer engine executes simulator 115 to perform a simulation of the injection molding process based on the mold insert model created by the simulator 112 and from associated molding parameters, such as choice of material, temperature, pressure, etc. The simulation of the injection molding process results in a model of the injection molded part. It will be appreciated that the simulation process may be an iterative process where various process parameters and/or the mold insert model may iteratively be modified so as to optimize for one or more parameters, such as manufacturing tolerances, cycle time, etc. In particular, the optimizer engine may compare the model of the molded part which results from the simulation with the originally received CAD model of the part to be injection molded so as to estimate the tolerances. If the model of the injection molded part shows that the injection molded part lies outside the target tolerances, the optimizer engine may alter the mold insert model and/or the process parameters and execute simulator 115 again based on the modified model and/or process parameters. The optimizer engine may even execute both simulators 112 and 115 again.

The mold insert manufacturing simulator 112 may include one or more manufacturing simulator engines 113, each configured to simulate a respective manufacturing process or a part thereof, e.g. a 3D printing process, a molding process, a metal machining process, a post-processing process, etc. For example, the mold insert manufacturing process may be simulated using known simulation techniques.

Similarly, the injection molding simulator 115 comprises respective sub-modules for simulating the respective stages of the injection molding process, e.g. a filling process simulator 116, a cooling simulator 117 and an ejection simulator 118. Generally, the injection molding simulator is configured to model and predict the performance and dynamics of the mold insert in combination with an injection molding equipment as it injects a particular material into a particular mold cavity. The shape of the mold cavity, process parameters as well as the material used in the simulation can result in a particular, predicted result. It will further be appreciated that the injection molding simulator may be divided into additional or alternative sub-modules, e.g. including a packing simulator.

More specifically, the filling process simulator 116 is configured to simulate the filling process for filling the mold cavity with the material from which the part is to be molded. This process may e.g. be modelled by a discretized flow model based on discrete volume elements. The heat distribution during this process may similarly be modeled by a discretized heat transport model.

The cooling simulator 117 is configured to simulate the cooling process of the material inside the mold cavity. This process may e.g. be modelled by a discretized heat transport model based on discrete volume elements of the mold cavity and the mold insert. The model may model the heat transport inside the material that has been injected into the mold cavity, the heat transport into the mold insert and the heat transport to the surrounding, e.g. by the flow of coolant through the cooling channels of the mold insert.

The cooling simulator may further simulate the behavior of the material inside the mold cavity during the cooling process, e.g. shrinking, stress creation, etc.

The ejection simulator 118 is configured to simulate the ejection of the molded part from the mold insert. For example, this stage may be modelled by a physics simulation tool where the molded part and the cavity are modelled as rigid bodies.

FIG. 2 schematically illustrates an embodiment of a mold insert. The mold insert of FIG. 2 includes two parts 220 and 230, respectively that together define a mold cavity 221 for molding a part 240, in this example a plastic toy construction element.

In apparatus claims enumerating several features, several of these features can be embodied by one and the same item of hardware. The mere fact that certain measures are recited in mutually different dependent claims or described in different embodiments does not indicate that a combination of these measures cannot be used to advantage.

It should be emphasized that the term "comprises/comprising" when used in the present disclosure is taken to specify the presence of stated features, integers, steps or components but does not preclude the presence or addition of one or more other features, integers, steps, components or groups thereof.

The invention claimed is:

1. A polymer mold insert for an injection molding tool, the polymer insert comprising:
   an insert body part having an outer shape adapted for insertion into an insert cavity arranged in the injection molding tool;
   wherein the insert body part comprises at least two different polymer materials having different physical characteristics and being distributed within the insert body so that one or more first volumes of the insert body comprises a higher concentration of a first one of the two different polymer materials than in remaining parts of the insert body;
   wherein one or more second volumes of the insert body comprises a higher concentration of the second one of the two different polymer materials than in the remaining parts of the insert body part; and
   wherein the one or more first or second volumes define rounded, localized shapes, and the other of the one or more first or second volumes is disposed around the rounded, localized shapes.

2. A polymer mold insert according to claim 1, wherein the two different polymers comprise the first polymer material having a high heat conductivity and the second polymer material having a lower heat conductivity than the first polymer material.

3. A polymer mold insert according to claim 1, wherein the two different polymer materials comprise the first polymer material having high wear resistance properties and the second polymer material having lower wear resistance properties compared to the first polymer material.

4. A polymer mold insert according to claim 1, wherein the polymer insert comprises one or more cooling channels extending through the insert body part, and wherein at least one of the first volumes of the insert body part completely or at least partly surrounds the cooling channel and comprises the first one of the polymer materials having a higher heat conductivity than the polymer material in the second volumes of the insert body part.

5. A polymer mold insert according to claim 1, wherein the polymer insert comprises at least one inner surface of the polymer insert that are exposed to a flow of molten material during the molding process in the injection mold, and wherein at least one of the first volumes of the insert body part completely or at least partly forms the inner surface and comprises the first one of the polymer materials having a higher wear resistance than the polymer material in the second volumes of the insert body part.

6. A polymer mold insert according to claim 1, wherein the at least one inner surface of the polymer insert at least partly constitutes a runner channel, a sprue gate or a tunnel gate in the injection molding tool.

7. A polymer mold insert according to claim 6, wherein the at least one inner surface of the polymer insert at least partly constitutes a mold cavity in the injection molding tool.

8. A polymer mold insert according to claim 1, wherein the distribution of the two different polymer materials in the polymer insert comprises multiple small volumes (voxels), and wherein a number of the small volumes are constituted only by the first one of the polymer materials and the remaining number of small volumes are constituted by the second one of the polymer materials.

9. A polymer mold insert for an injection molding tool, the polymer insert comprising:
   an insert body part defining:
      a periphery configured for insertion into an insert cavity defined by the injection molding tool;
      rounded, localized volumes formed by a first polymer material; and
      a second volume disposed around the rounded, localized volumes, the second volume formed by a second polymer material different from the first polymer material.

10. A polymer mold insert according to claim 9, wherein the second polymer material has a lower heat conductivity than the first polymer material.

11. A polymer mold insert according to claim 9, wherein the second polymer material has a higher wear resistance than the first polymer material.

12. A polymer mold insert according to claim 9, wherein the rounded, localized volumes firmed by the first polymer material correspond to and align with cooling channels defined by the injection molding tool.

13. A system for injection molding comprising:
   an injection molding tool defining:
      an insert cavity; and
      a plurality of cooling channels;
   a polymer mold insert defining:
      a periphery configured for insertion into the insert cavity of the injection molding tool;
      rounded, localized volumes formed by a first polymer material, the rounded, localized volumes corresponding and aligning with the plurality of cooling channels; and
      a second volume disposed around the rounded, localized volumes, formed by a second polymer material different from the first polymer material, the second polymer material having a heat conductivity lower than that of the first polymer material.

14. A system according to claim 9, wherein the second polymer material has a higher wear resistance than the first polymer material.

* * * * *